US009263948B1

(12) United States Patent
Vovos et al.

(10) Patent No.: US 9,263,948 B1
(45) Date of Patent: Feb. 16, 2016

(54) INPUT OUTPUT BALANCED BIDIRECTIONAL BUCK-BOOST CONVERTERS AND ASSOCIATED SYSTEMS AND METHODS

(71) Applicant: BAE SYSTEMS Controls Inc., Endicott, NY (US)

(72) Inventors: Robert J. Vovos, Vestal, NY (US); Peter A. Carruthers, Ithaca, NY (US); Arthur P. Lyons, Maine, NY (US)

(73) Assignee: BAE SYSTEMS CONTROLS INC., Endicott, NY (US)

( * ) Notice: Subject to any disclaimer, the term of this patent is extended or adjusted under 35 U.S.C. 154(b) by 0 days.

(21) Appl. No.: 14/496,570

(22) Filed: Sep. 25, 2014

(51) Int. Cl.
| | |
|---|---|
| *H02M 3/158* | (2006.01) |
| *H02M 3/335* | (2006.01) |
| *H02M 7/48* | (2007.01) |
| *H02M 5/22* | (2006.01) |
| *H02M 7/797* | (2006.01) |
| *H02P 25/02* | (2006.01) |
| *H02P 25/22* | (2006.01) |

(52) U.S. Cl.
CPC ............ *H02M 3/158* (2013.01); *H02M 3/1582* (2013.01); *H02M 3/33584* (2013.01); *H02M 5/225* (2013.01); *H02M 7/797* (2013.01); *H02M 2007/4815* (2013.01); *H02P 25/22* (2013.01)

(58) Field of Classification Search
CPC .............. H02M 3/1582; H02M 7/797; H02M 2007/4815; H02M 3/33584; H02M 5/225; H02P 25/22
See application file for complete search history.

(56) References Cited

U.S. PATENT DOCUMENTS

| 5,027,264 | A | * | 6/1991 | DeDoncker | ....... H02M 3/33584 363/129 |
|---|---|---|---|---|---|
| 5,933,331 | A | * | 8/1999 | Boldin | ..................... H02J 9/062 323/285 |
| 6,678,132 | B1 | | 1/2004 | Carruthers et al. | |
| 7,832,513 | B2 | | 11/2010 | Verbrugge et al. | |
| 8,513,928 | B2 | | 8/2013 | Totterman et al. | |
| 2006/0233000 | A1 | * | 10/2006 | Akagi | ................. H02M 5/4585 363/37 |
| 2009/0171521 | A1 | * | 7/2009 | Moki | ...................... B60L 11/18 701/22 |
| 2013/0057200 | A1 | * | 3/2013 | Potts | ................. H02M 3/33584 320/107 |
| 2013/0229839 | A1 | | 9/2013 | Escobar et al. | |

OTHER PUBLICATIONS www.learnabout-electronics.org, "Power Supplies", 2007-2013, pp. 1-20.
Vujanic, R., "Design and Control of a Buck-Boost DC-DC Power Converter", Semester Thesis Jul. 2008, pp. 1-61.
http://ecee.colorado.edu/copec/book/slides/Ch6slide.pdf, "Fundamentals of Power Electronics", Chapter 6: Converter circuits, 2014, pp. 1-101, downloaded May 16, 2014.

(Continued)

*Primary Examiner* — Adolf Berhane
*Assistant Examiner* — Henry Lee, III
(74) *Attorney, Agent, or Firm* — Scully, Scott, Murphy & Presser, P.C.

(57) ABSTRACT

Various embodiments of the present invention relate to an input output balanced bidirectional buck-boost converter and associated system and method. In one example, a DC/DC bidirectional buck-boost power converter has both input and output voltages centered around chassis. This converter allows for overlapping input and output voltages, and allows for use of offset based leakage fault detection.

20 Claims, 15 Drawing Sheets

(56) References Cited

OTHER PUBLICATIONS http://www.hybridrive.com/pdfs/HybriDrive%20PCS%20DATA%20SHEET.pdf, "Propulsion Control System (PCS)", 2013, pp. 1-2, downloaded May 16, 2014.
http://www.semikron.com/products/product-classes/systems/detail/skai-90-a2-gd06-wci-14282034.html, "Semikron", printed Jun. 2, 2014.

* cited by examiner

INPUT OUTPUT BALANCED BIDIRECTIONAL BUCK-BOOST CONVERTERS AND ASSOCIATED SYSTEMS AND METHODS

BACKGROUND OF THE INVENTION

1. Field of the Invention

Various embodiments of the present invention relate to an input output balanced bidirectional buck-boost converter and associated system and method.

As described herein, a DC/DC bidirectional buck-boost power converter has both input and output voltages centered around chassis. This converter allows for overlapping input and output voltages, and allows for use of offset based leakage fault detection (see, e.g., U.S. Pat. No. 6,678,132).

In one example, the converter (and associated system and method) may be used to interface any desired DC power source with any desired energy storage system.

2. Description of Related Art

Various conventional buck-boost converters are known. Some of these conventional buck-boost converters are bidirectional buck-boost converters.

SUMMARY OF THE INVENTION

In one embodiment, two three-phase inverters have their AC phases interconnected through line inductors and their DC links interconnected through capacitors. In this embodiment, the input inverter receiving DC power generates an optimal effective EMF source which regulates its output voltage in order to minimize line currents by maximizing power-factor. Further, in this embodiment, the output inverter outputting DC power regulates current in the AC link using a back EMF observer, phase-locked loop, field-oriented current controller, and a DC link voltage regulator. The capacitors between the DC links provide passive common mode control, directing inverter driven common mode voltages across the line inductors and controlling the return path for the common mode currents.

In another embodiment, a bidirectional buck-boost converter is provided, comprising: a first inverter, the first inverter comprising a first inverter positive DC terminal, a first inverter negative DC terminal, a first inverter phase one AC terminal, a first inverter phase two AC terminal and a first inverter phase three AC terminal; a second inverter, the second inverter comprising a second inverter positive DC terminal, a second inverter negative DC terminal, a second inverter phase one AC terminal, a second inverter phase two AC terminal and a second inverter phase three AC terminal; a phase one inductor wound on a phase one inductor core, the phase one inductor being configured to electrically connect the first inverter phase one AC terminal with the second inverter phase one AC terminal; a phase two inductor wound on a phase two inductor core, the phase two inductor being configured to electrically connect the first inverter phase two AC terminal with the second inverter phase two AC terminal; a phase three inductor wound on a phase three inductor core, the phase three inductor being configured to electrically connect the first inverter phase three AC terminal with the second inverter phase three AC terminal; a positive side DC capacitor configured to electrically connect the positive DC terminal of the first inverter to the positive DC terminal of the second inverter; and a negative side DC capacitor configured to electrically connect the negative DC terminal of the first inverter to the negative DC terminal of the second inverter; wherein each of the phase one inductor core, the phase two inductor core and the phase three inductor core are independent cores.

In another embodiment, a power system configured for use in a vehicle is provided, the power system comprising: a current source; a current sink; a controller; and a bidirectional buck-boost converter, the bidirectional buck-boost converter comprising: a first inverter, the first inverter comprising a first inverter positive DC terminal, a first inverter negative DC terminal, a first inverter phase one AC terminal, a first inverter phase two AC terminal and a first inverter phase three AC terminal; a second inverter, the second inverter comprising a second inverter positive DC terminal, a second inverter negative DC terminal, a second inverter phase one AC terminal, a second inverter phase two AC terminal and a second inverter phase three AC terminal; a phase one inductor wound on a phase one inductor core, the phase one inductor being configured to electrically connect the first inverter phase one AC terminal with the second inverter phase one AC terminal; a phase two inductor wound on a phase two inductor core, the phase two inductor being configured to electrically connect the first inverter phase two AC terminal with the second inverter phase two AC terminal; a phase three inductor wound on a phase three inductor core, the phase three inductor being configured to electrically connect the first inverter phase three AC terminal with the second inverter phase three AC terminal; a positive side DC capacitor configured to electrically connect the positive DC terminal of the first inverter to the positive DC terminal of the second inverter; and a negative side DC capacitor configured to electrically connect the negative DC terminal of the first inverter to the negative DC terminal of the second inverter; wherein each of the phase one inductor core, the phase two inductor core and the phase three inductor core are independent cores; and wherein the controller is configured to operate in one of: (a) a first mode in which the current source is connected to the first inverter positive DC terminal and the first inverter negative DC terminal and the current sink is connected to the second inverter positive DC terminal and the second inverter negative DC terminal; and (b) a second mode in which the current sink is connected to the first inverter positive DC terminal and the first inverter negative DC terminal and the current source is connected to the second inverter positive DC terminal and the second inverter negative DC terminal; wherein, in the first mode the controller is configured to cause: (a) the first inverter to generate three-phase voltage at a fixed-frequency; and (b) the second inverter to generate three-phase current at the fixed-frequency; and wherein, in the second mode the controller is configured to cause: (a) the second inverter to generate three-phase voltage at a fixed-frequency; and (b) the first inverter to generate three-phase current at the fixed-frequency.

In another embodiment, a method of providing a bidirectional buck-boost converter is provided, the method comprising: providing a first inverter, the first inverter comprising a first inverter positive DC terminal, a first inverter negative DC terminal, a first inverter phase one AC terminal, a first inverter phase two AC terminal and a first inverter phase three AC terminal; providing a second inverter, the second inverter comprising a second inverter positive DC terminal, a second inverter negative DC terminal, a second inverter phase one AC terminal, a second inverter phase two AC terminal and a second inverter phase three AC terminal; providing a phase one inductor wound on a phase one inductor core, the phase one inductor electrically connecting the first inverter phase one AC terminal with the second inverter phase one AC terminal; providing a phase two inductor wound on a phase two inductor core, the phase two inductor electrically connecting the first inverter phase two AC terminal with the second inverter phase two AC terminal; providing a phase three inductor wound on a phase three inductor core, the phase three inductor electrically connecting the first inverter phase three AC terminal with the second inverter phase three AC terminal; providing a positive side DC capacitor electrically connecting the positive DC terminal of the first inverter to the positive DC terminal of the second inverter; and providing a negative side DC capacitor electrically connecting the negative DC terminal of the first inverter to the negative DC terminal of the second inverter; wherein each of the phase one inductor core, the phase two inductor core and the phase three inductor core are independent cores.

BRIEF DESCRIPTION OF THE DRAWINGS

The drawings are provided for illustrative purpose only and do not necessarily represent practical examples of the present invention to scale. In the figures, same reference signs are used to denote the same or like parts.

DETAILED DESCRIPTION OF THE INVENTION

For the purposes of describing and claiming the present invention the term "converter" is intended to refer to a mechanism (e.g., circuit and/or device) for changing an input direct current (DC) having an input voltage value and an input current value to an output direct current (DC) having an output voltage value and an output current value (wherein the output voltage value differs from the input voltage value and/or the output current value differs from the input current value).

For the purposes of describing and claiming the present invention the term "inverter" is intended to refer to a mechanism (e.g., circuit and/or device) for: (a) changing direct current (DC) into alternating current (AC); and/or (b) changing alternating current (AC) into direct current (DC).

For the purposes of describing and claiming the present invention the term "current source" is intended to refer not only to an ideal textbook current source with infinite voltage compliance, but in some circumstances to other mechanisms capable of supplying current, such as an ideal voltage source capable of supplying current, with or without series impedance, or one or more DC power sources connected in parallel, which can deliver power to the converter terminals.

For the purposes of describing and claiming the present invention the term "current sink" is intended to refer not only to an ideal textbook current sink with infinite voltage compliance, but in some circumstances to other mechanisms capable of consuming current, which can include one or more resistive or active electronic loads connected in parallel, or a voltage with or without series impedance.

Figure 1:
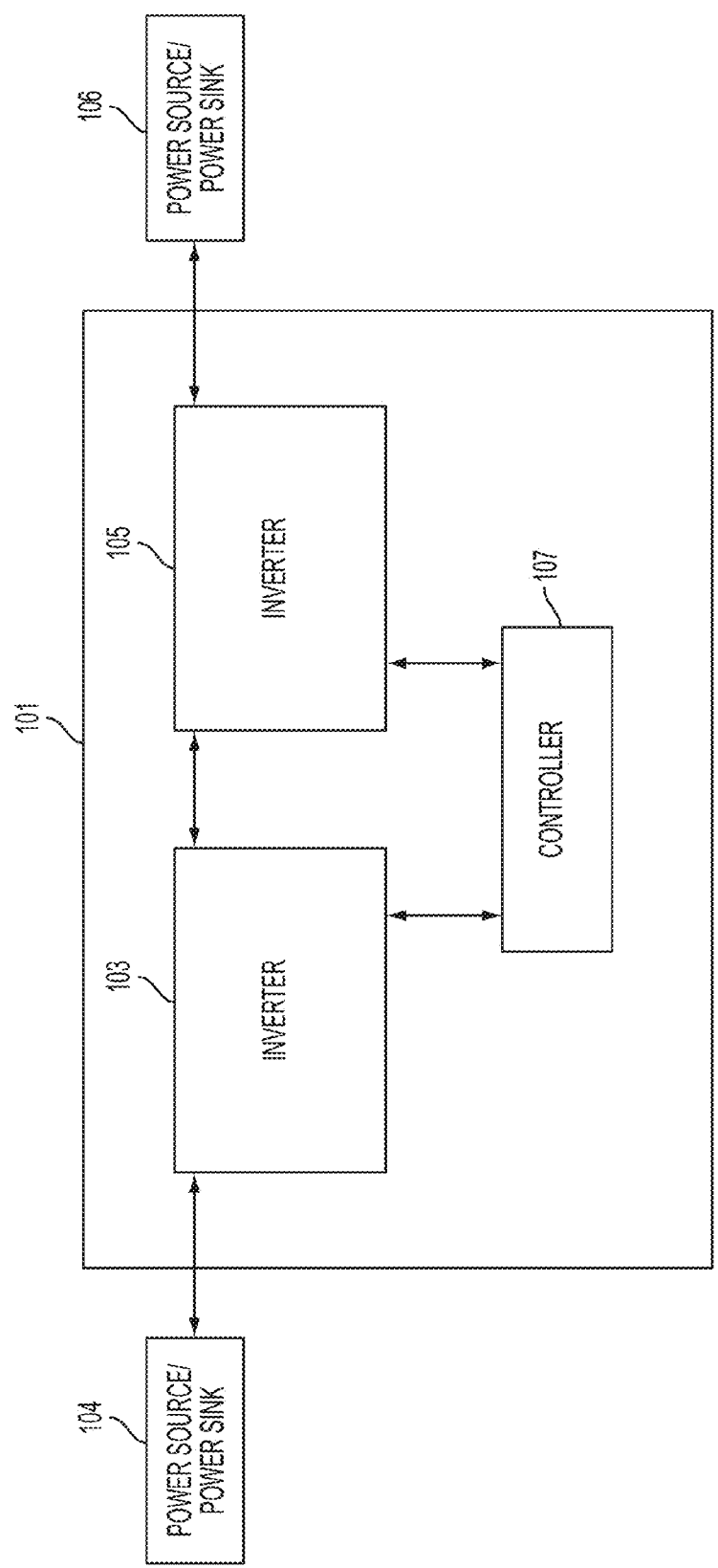
FIG. 1 is a high-level block diagram of an input output balanced buck-boost converter according to an embodiment of the present invention.

With reference now to FIG. 1, an input output balanced buck-boost converter 101 according to an embodiment of the present invention is shown. As seen in this FIG. 1 (which is a high-level block diagram), converter 101 includes inverters 103 and 105 and controller 107. Controller 107 is in operative communication with inverters 103,105 to control inverters 103,105 as discussed herein. Inverter 103 receives power from or provides power to power source/power sink 104. Similarly, Inverter 105 receives power from or provides power to power source/power sink 106. Of note, converter 101 is a bidirectional converter. Thus, when power source/power sink 104 acts as a power source (that is, supplying power to inverter 103), inverter 105 will supply power to power source/power sink 106 (which, in this instance, will act as a power sink that receives power from inverter 105). Conversely, when power source/power sink 106 acts as a power source (that is, supplying power to inverter 105), inverter 103 will supply power to power source/power sink 104 (which, in this instance, will act as a power sink that receives power from inverter 103). In one example, each of inverters 103 and 105 may utilize hardware structure similar to that of a conventional inverter.

Figure 2:
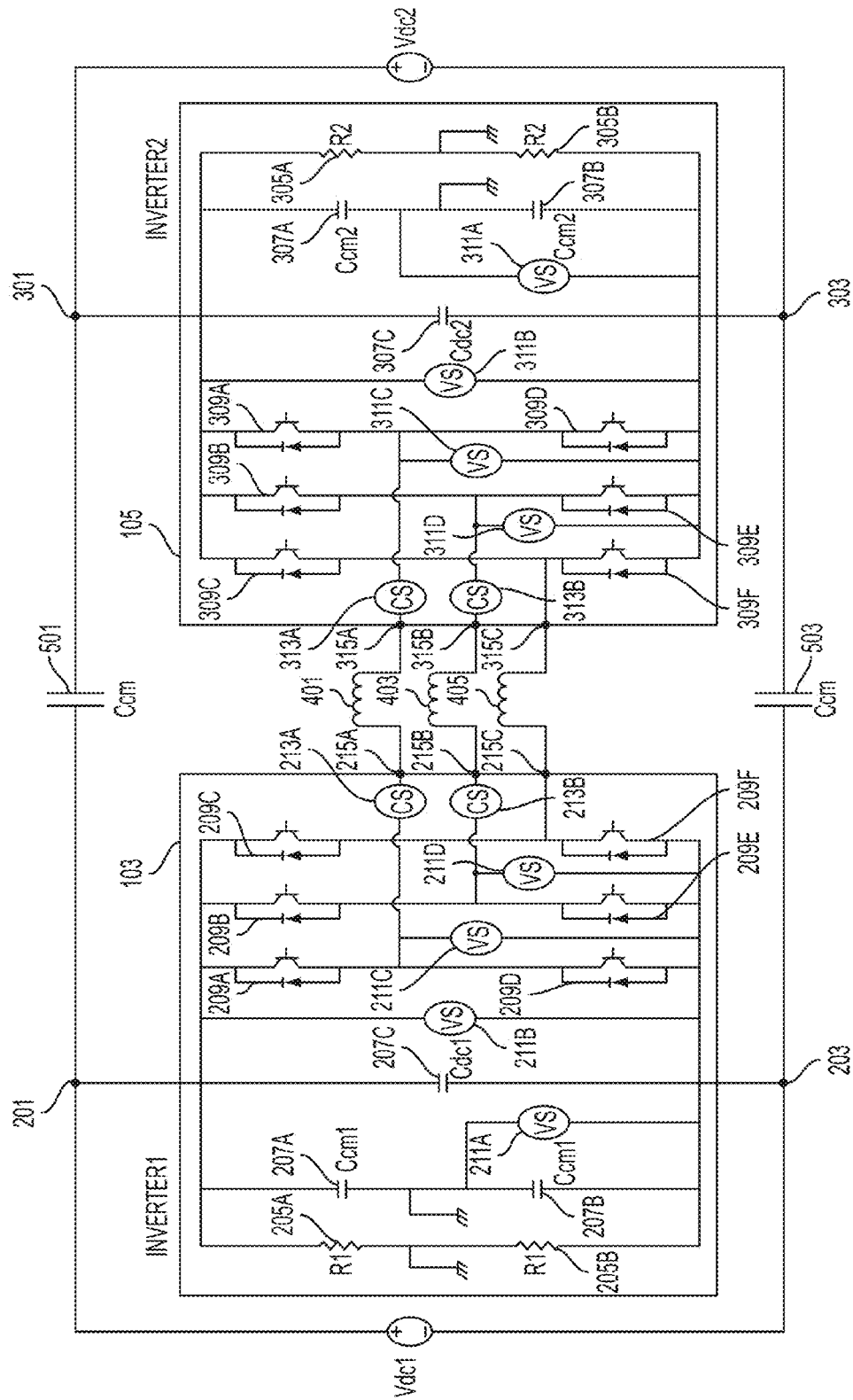
FIG. 2 is a diagram showing details of the inverters of FIG. 1 according to an embodiment of the present invention.

With reference now to FIG. 2, details of inverters 103 and 105 according to this embodiment are shown. As seen in this FIG. 2, inverter 103 comprises positive DC terminal 201, negative DC terminal 203, resistors 205A,205B, capacitors 207A-207C, switches 209A-209F (e.g., comprising solid state devices), voltage sensors 211A-211D and current sensors 213A, 213B.

Similarly, inverter 105 comprises positive DC terminal 301, negative DC terminal 303, resistors 305A,305B, capacitors 307A-307C, switches 309A-309F (e.g., comprising solid state devices), voltage sensors 311A-311D and current sensors 313A, 313B.

Further, inverter 103 comprises phase one AC terminal 215A, phase two AC terminal 215B and phase three AC terminal 215C. In addition, inverter 105 comprises phase one AC terminal 315A, phase two AC terminal 315B and phase three AC terminal 315C. Inductor 401 electrically connects phase one AC terminal 215A with phase one AC terminal 315A. Further, Inductor 403 electrically connects phase two AC terminal 215B with phase two AC terminal 315B. Further still, Inductor 405 electrically connects phase three AC terminal 215C with phase three AC terminal 315C.

In this embodiment, each of inductors 401, 403, 405 is separately wound on an independent core (not shown). This configuration of separately winding on an independent core each of inductors 401, 403, 405 results in the inductors 401, 403, 405 providing common mode and differential mode inductance.

Still referring to FIGS. 1 and 2, converter 101 includes capacitor 501 configured to electrically connect positive DC terminal 201 with positive DC terminal 301. Further, converter 101 includes capacitor 503 configured to electrically connect negative DC terminal 203 with negative DC terminal 303.

In this embodiment, the use of capacitor 501 between positive DC terminal 201 and positive DC terminal 301 along with the use of capacitor 503 between negative DC terminal 203 and negative DC terminal 303 provides for a common mode current return path that returns high frequency noisy current (instead of through the chassis).

Figure 3:
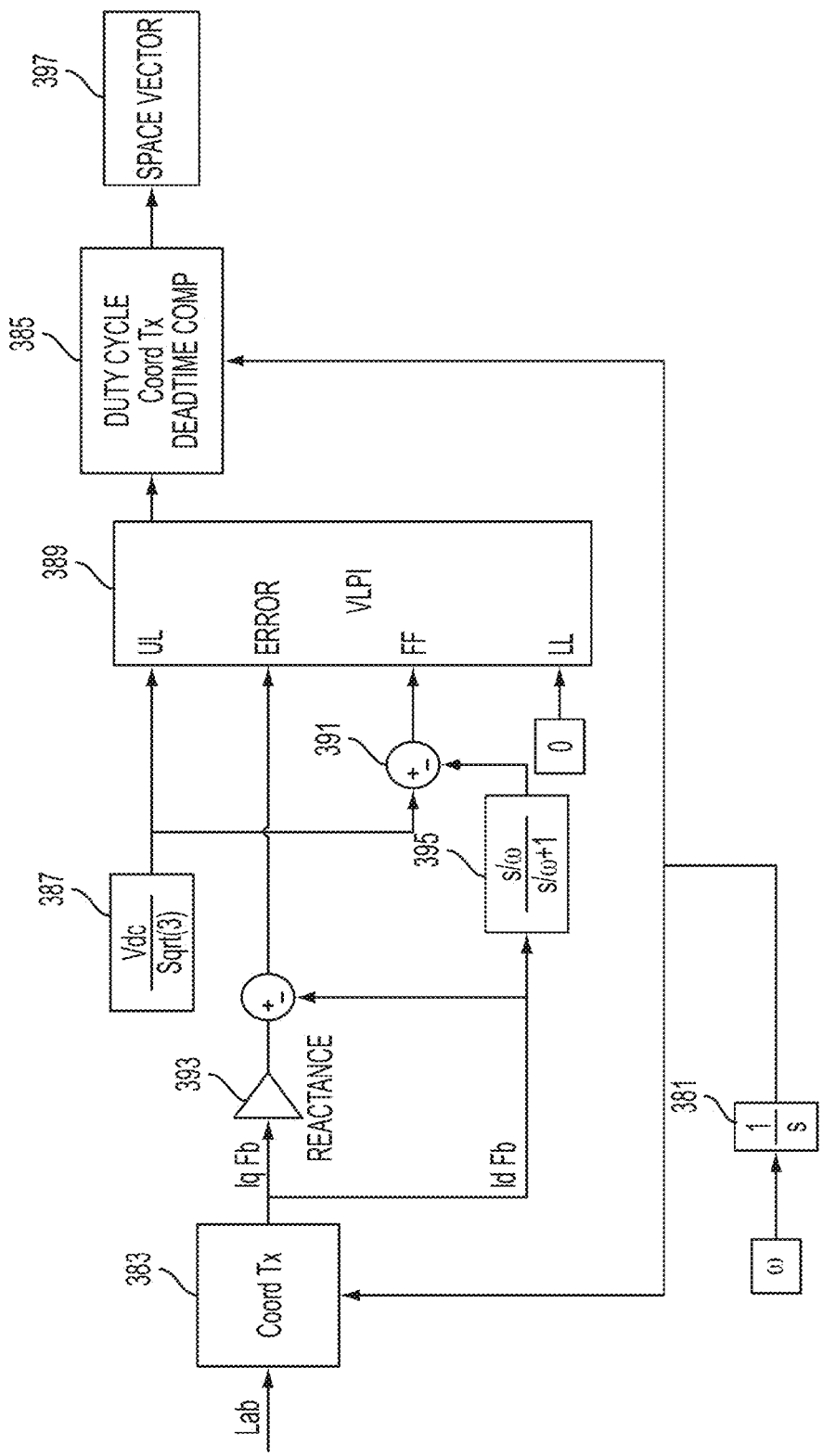
FIG. 3 is a diagram (showing power factor corrected V/Hz) of an example of converter control (input) according to an embodiment of the present invention.

Referring now to FIG. 3 (showing power factor corrected V/Hz), an example of converter control (input) is shown. This block diagram of FIG. 3 shows functionality of the type that may be implemented in controller 107.

As seen in this FIG. 3, an input to the control mechanism is $I_{ab}$. When inverter 103 is receiving DC power (and inverter 105 is outputting DC power), this $I_{ab}$ may be detected by current sensors 213A and 213B. Conversely, when inverter 105 is receiving DC power (and inverter 103 is outputting DC power), this $I_{ab}$ may be detected by current sensors 313A and 313B.

Another input to the control mechanism is frequency $\omega$. As seen, this $\omega$ is input to 1/s block 381 and the output thereof is provided to both Coordinate Transformation block 383 and Duty Cycle/Coordinate Transformation/Deadtime Compensation block 385.

Another input to the control mechanism is Vdc/Sqrt(3) block 387. As seen, the output of this Vdc/Sqrt(3) block 387 is provided to upper limit (UL) input of variable limiter proportional integrator (VLPI) 389 (the output of this block 387 is also combined at block 391 as described below).

Still referring to FIG. 3, it is seen that $I_{ab}$ is input to Coordinate Transformation block 383. Coordinate Transformation block 383 outputs $I_q$ Fb (feedback) and outputs $I_d$ Fb (feedback). $I_q$ Fb is fed to Reactance block 393 and the output of Reactance block 393 is combined with $I_d$ Fb and provided to error input of VLPI 389.

Further, $I_d$ Fb is provided to (s/$\omega$)/(s/$\omega$+1) block 395. The output of block 395 is combined at block 391 with the output of block 387. The output of block 391 is then provided to FF input of VLPI 389.

In addition, a value of 0 is provided to lower limit (LL) input of VLPI 389.

Finally, a space vector 397 is provided as an output from block 385. This space vector 397 (which may be in the form of an industry standard switching protocol) may control switching intervals of various switches by, for example, pulse width modulation (PWM). In one specific example, when inverter 103 is receiving DC power (and inverter 105 is outputting DC power), this space vector 397 may control switching of switches 209A-209F of inverter 103 of FIG. 2. In another specific example, when inverter 105 is receiving DC power (and inverter 103 is outputting DC power), this space vector 397 may control switching of switches 309A-309F of inverter 105 of FIG. 2.

Still referring to FIG. 3, it is noted that in this example the control mechanism may be configured to generate 3-phase voltage at a fixed frequency (e.g., 60 Hz). Further, the control mechanism may operate to make inverter 103 (when receiving DC power) or inverter 105 (when receiving DC power) output power as if it were a rotating machine. Further, it is noted that when boosting, a V/Hz with a maximum possible phase voltage minimizes phase currents. Further still, it is noted that when bucking, the V/Hz voltage should be selected to provide unity power factor. Finally, it is noted that the feed forward path quickly compensates for increasing voltage overlap.

Still referring to FIG. 3, $\omega$ is the commanded frequency of the AC link; in this example, w is a constant and must be selected in order to minimize losses in the magnetics but still maintain enough reactive drop that the field weakening and power factor correct v/hz loops have enough control authority.

Still referring to FIG. 3, Vdc is the measured value of the inverter's DC link voltage.

Figure 4:
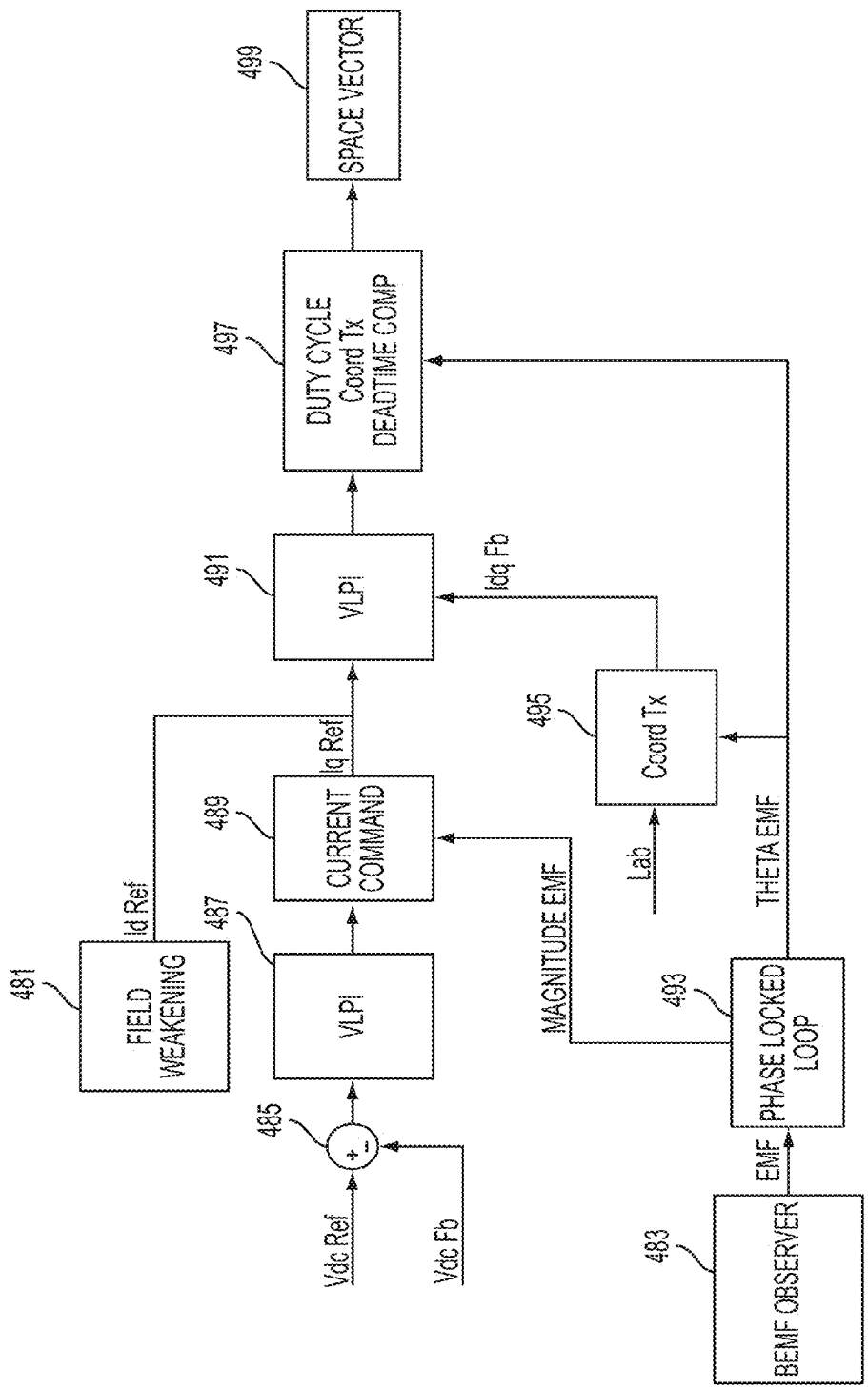
FIG. 4 is a diagram (showing field oriented controller with DC link regulation) of an example of converter control (output) according to an embodiment of the present invention.

Referring now to FIG. 4 (showing field oriented controller with DC link regulation) an example of converter control (output) is shown. This block diagram of FIG. 4 shows functionality of the type that may be implemented in controller 107.

As seen in this FIG. 4, two inputs to the control mechanism are $V_{dc}$ Ref (desired output voltage) and $V_{dc}$ Fb (feedback). Other inputs to the control mechanism are from field weakening detection at block 481 and from back EMF (BEMF) Observer at block 483 (in one example, the BEMF (Back Electromotive Force) Observer may recreate AC voltage based upon known voltage, known current and known inductance (e.g., inductors 401, 403 and 405)).

Another input to the control mechanism is $I_{ab}$. When inverter 105 is outputting DC power (and inverter 103 is receiving DC power), this $I_{ab}$ may be detected by current sensors 313A and 313B. Conversely, when inverter 105 is receiving DC power (and inverter 103 is outputting DC power), this $I_{ab}$ may be detected by current sensors 213A and 213B.

Further, as seen, $V_{dc}$ Ref and $V_{dc}$ Fb are combined at block 485 and the output of block 485 is sent to VPLI 487. Further the output of block 487 is sent to current command block 489. The output of block 489, that is, $I_q$ Ref (along with $I_d$ Ref from block 481) is sent to VPLI 491.

Further, as seen, EMF from block 483 is sent to phase locked loop block 493. From block 493 a magnitude EMF is sent to block 489. In addition, from block 493, a Theta EMF is sent to Coordinate Transformation block 495 and Duty Cycle/Coordinate Transformation/Deadtime Compensation block 497.

Further, as seen, $I_{ab}$ is input to block 495 (along with Theta EMF) and $I_{dq}$ Fb is output from block 495 and sent to VLPI 491. In addition, an output from VLPI 491 is sent (along with Theta EMF) to block 497.

Finally, a space vector 499 is provided as an output from block 497. This space vector 499 (which may be in the form of an industry standard switching protocol) may control switching intervals of various switches by, for example, pulse width modulation (PWM). In one specific example, when inverter 103 is receiving DC power (and inverter 105 is outputting DC power), this space vector 419 may control switching of switches 309A-309F of inverter 105 of FIG. 2. In another specific example, when inverter 105 is receiving DC power (and inverter 103 is outputting DC power), this space vector 419 may control switching of switches 209A-209F of inverter 103 of FIG. 2.

Still referring to FIG. 4, it is noted that in this example the control mechanism may be configured to treat the generated voltage at the phase inductor(s) (see, e.g., inductors 401, 403 and 405 of FIG. 2) as a fixed frequency. In one specific example, the control mechanism may be configured to provide, in effect, rotating machine control. In another specific example, the control mechanism may be configured to provide, in effect, regulation of current. Further, in another specific example, the field oriented controller may utilize standard SMPM (Surface Mount Permanent Magnet) sensorless control. Further, in another specific example, the voltage loop may provide regulated DC output. Further, in another specific example, the field weakening allows for overlapping input and output DC voltages.

Still referring to FIG. 4, the BEMF observer is a back-electro motive force observer. The purpose of the BEMF observer is to observe commanded phase voltage, measured phase currents and known inductances in order to reconstruct the AC voltage source (BEMF).

Still referring to FIG. 4, Vdc Ref is the command into the converter for the value of the output voltage and Vdc fb is the measured output voltage.

Still referring to FIG. 4, VLPI 487 and 491 are the same control structure (variable limiter proportional integrator regulators), the only difference being gains.

Referring now again to FIGS. 3 and 4, in one example, blocks 383 and 495 provide coordinate transformations of the AC current measurements in order to allow the control law to operate in a reference frame which rotates at the electrical frequency of the AC link. A benefit of this is that the AC fundamental frequency is decoupled and control action is performed on DC quantities.

Referring now again to FIGS. 3 and 4, in one example, blocks 385 and 497 primarily provide a counter rotation of the commanded phase voltage. Each block transforms the reference frame back to a stationary frame in effect converting the regulated DC quantities into AC phase voltage to be commanded to the converter. Each block then scales these voltages into switch duty cycles and compensated for the non-linearities caused by deadtime and inverter drop.

Referring now again to FIG. 4, in one example, block 481 "field weakening" calculates a required reactive current needed in order to reduce the magnitude of the effective AC link source voltage seen by the current regulator such that stable control can be maintained when the magnitude of the AC link source voltage approaches the capability provided by the current regulator's DC link.

Figure 5:
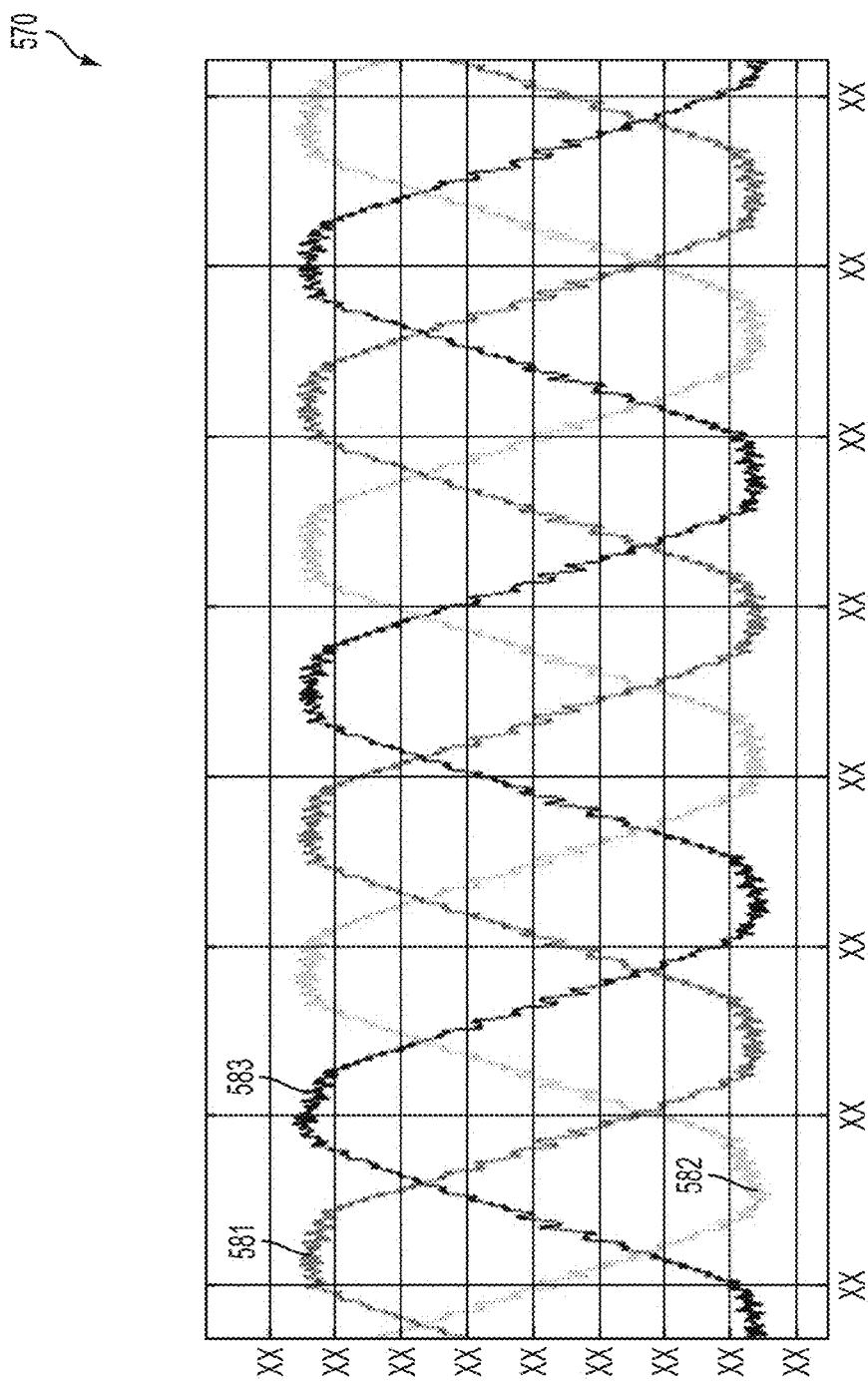
FIG. 5 is a sample of a typical converter control phase current waveform according to an embodiment of the present invention.

Referring now to FIG. 5, a sample of a typical converter control phase current waveform 570 according to an embodiment of the present invention is shown. As seen in this FIG. 5, phase currents 581, 583 and 585 (that is, corresponding to phases 1 to 3) are sinusoidal and balanced.

Figure 6:
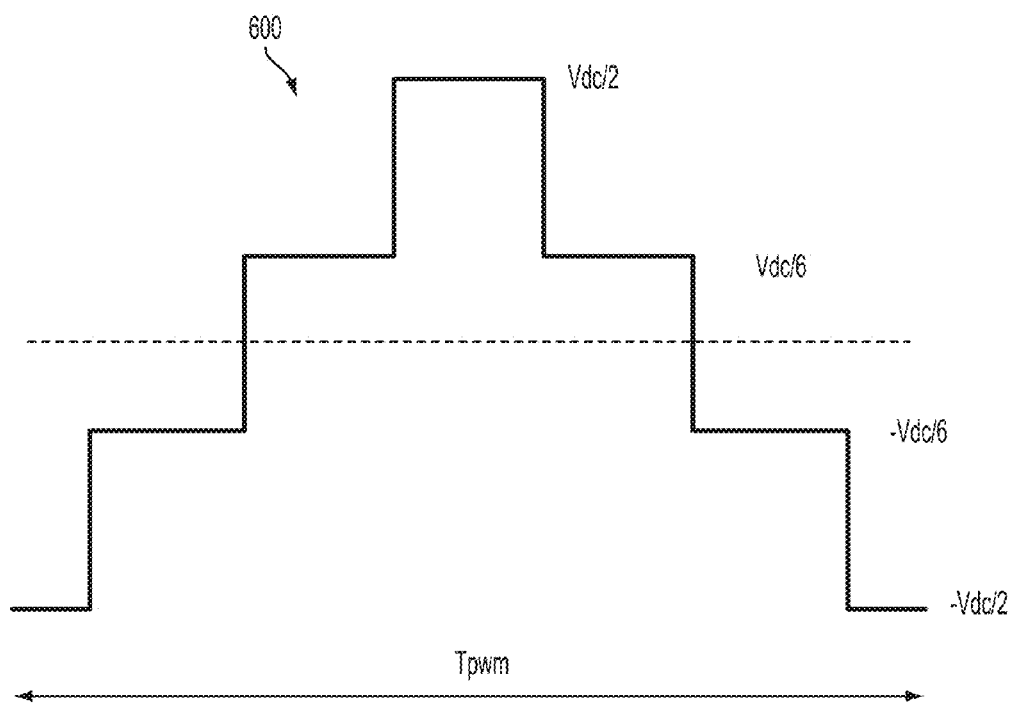
FIG. 6 is a sample inverter common mode source waveform according to an embodiment of the present invention.

Referring now to FIG. 6, a sample inverter common mode source waveform 600 according to an embodiment of the present invention is shown (the x-axis is pulse width modulation over time and the y-axis is voltage). As seen in this FIG. 6, the inverter sources significant common mode voltages at PWM rate. Thus, converter design should take into account where these voltages are dropped and how the resultant current flows.

Figure 7:
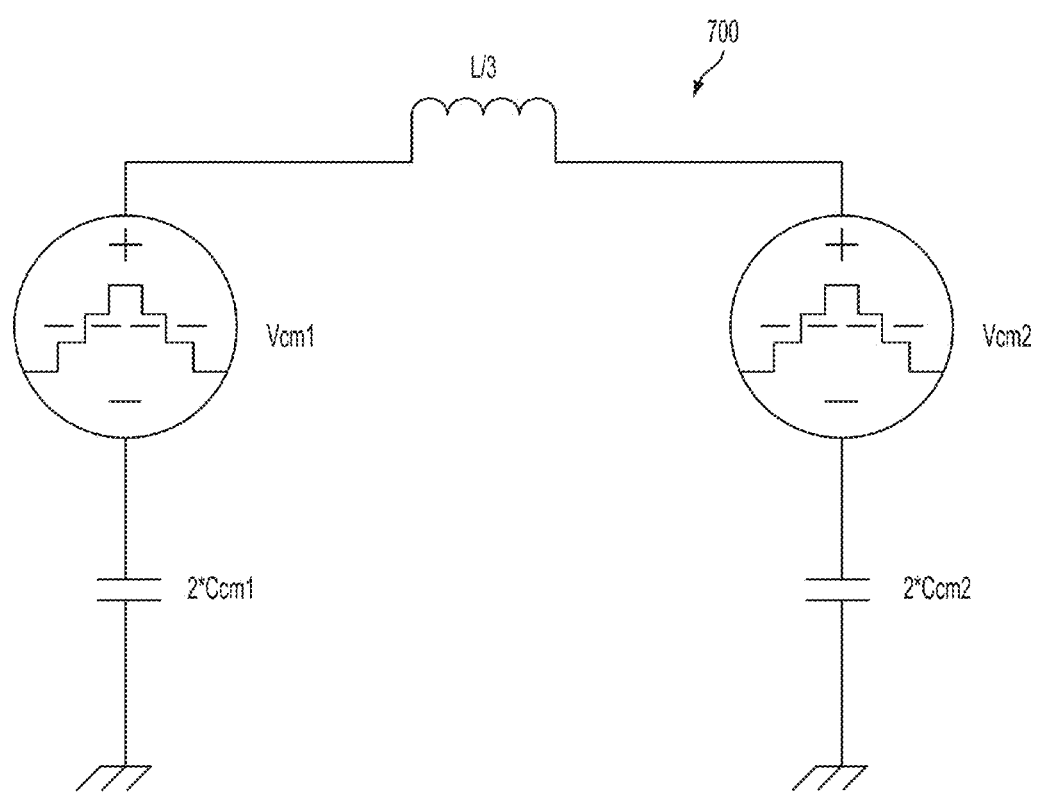
FIG. 7 is a sample inverter-inverter common mode equivalent circuit (showing the equivalent circuit if capacitors 501 and 503 of FIG. 2 are not used).

Referring now to FIG. 7, shown is a sample inverter-inverter common mode equivalent circuit 700 (showing the equivalent circuit if capacitors 501 and 503 of FIG. 2 are not used). As seen, if inverters are simply tied together through inductors: (a) Common mode current returns through chassis; and (b) Small Ccm (common mode capacitance) values force large voltages on chassis. Of note, in this FIG. 7, 2*Ccm1 corresponds to capacitors 207A and 207B of FIG. 2 and 2*Ccm2 corresponds to capacitors 307A and 307B of FIG. 2.

Figure 8:
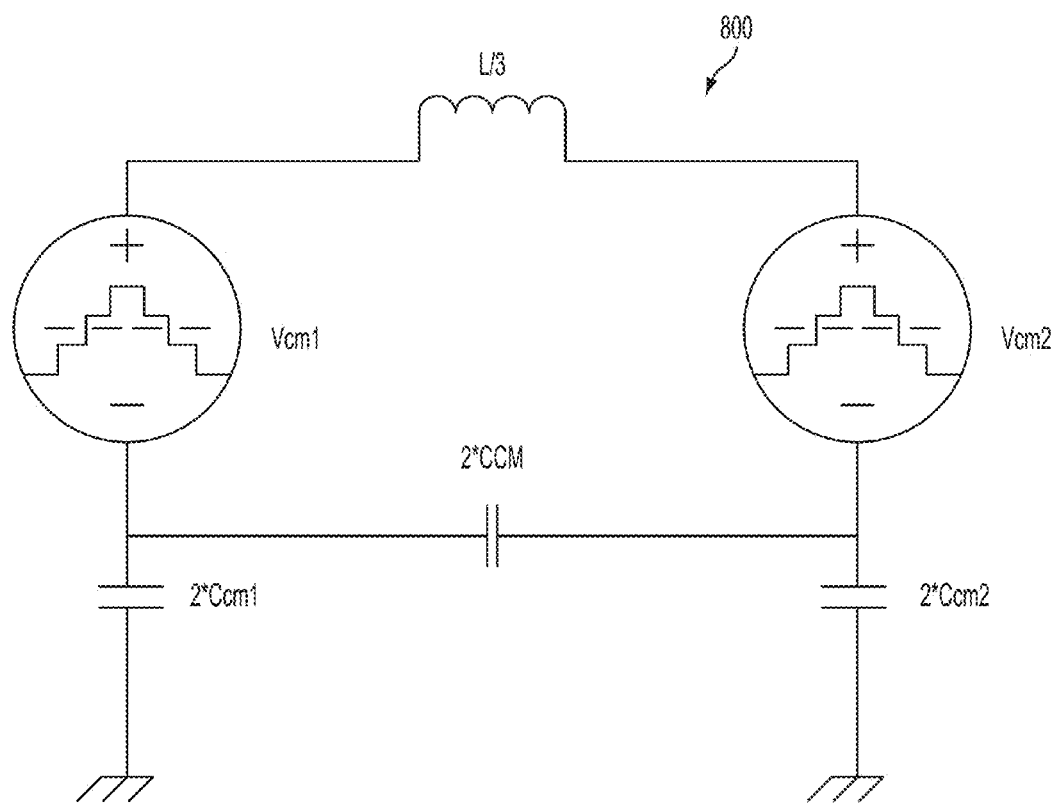
FIG. 8 is a sample inverter-inverter common mode equivalent circuit (showing a common mode equivalent circuit if capacitors 501 and 503 of FIG. 2 are used).

Referring now to FIG. 8, shown is a sample inverter-inverter common mode equivalent circuit 800 (showing a common mode equivalent circuit if capacitors 501 and 503 of FIG. 2 are used). As seen, capacitors 501 and 503 (shown in this FIG. 8 as 2*CCM) reduce or eliminate issues described with respect to FIG. 7. That is: (a) Common mode currents are directed back to their source though dedicated wires; and (b) Common mode voltages drop across line inductance eliminate any significant common mode voltage from appearing on DC links.

Figure 9:
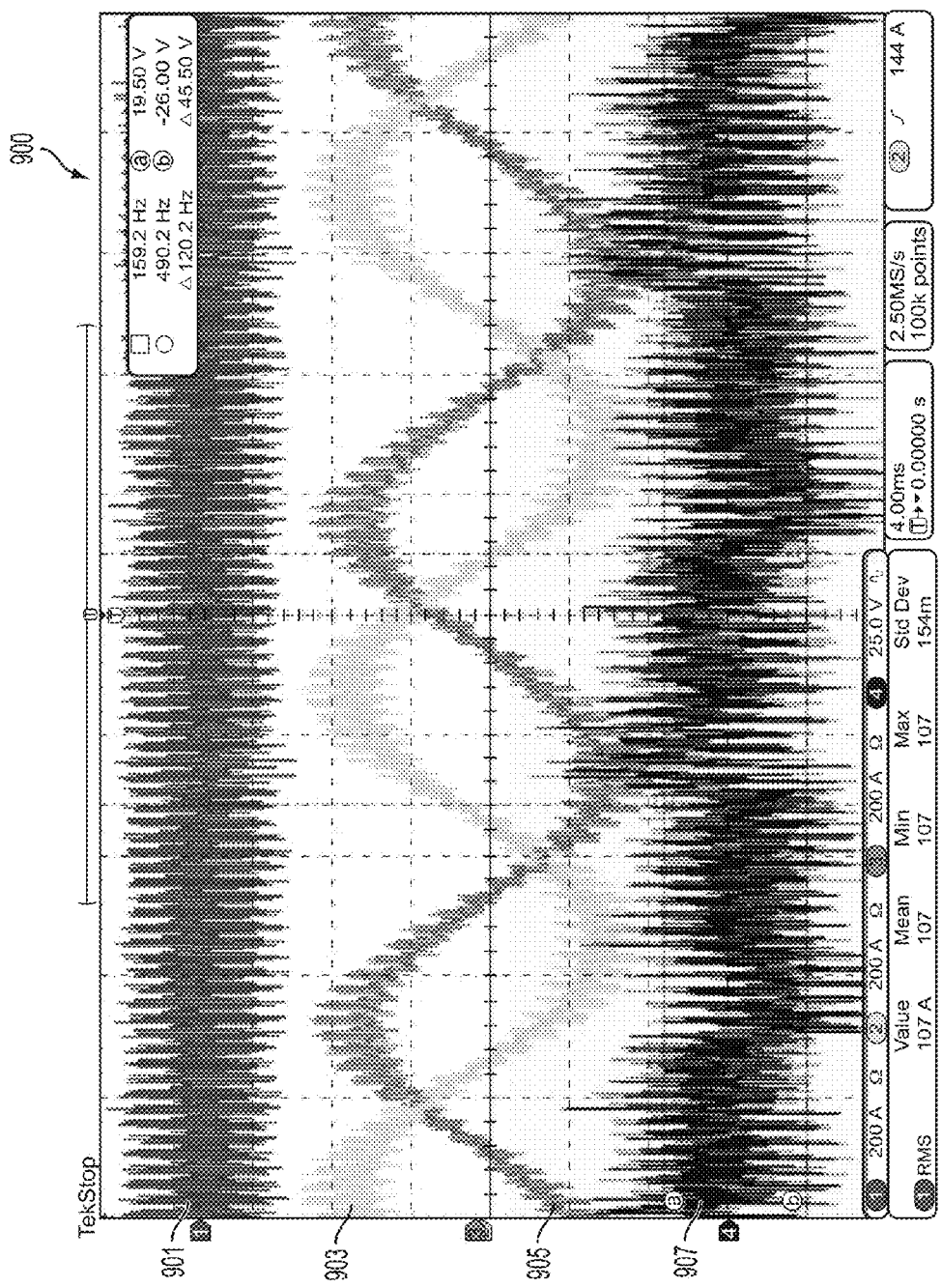
FIG. 9 is a sample of common mode waveforms according to an embodiment of the present invention.

Referring now to FIG. 9, a sample of common mode waveforms 900 according to an embodiment of the present invention is shown. More particularly, in this FIG. 9, common mode current 901, phase current 903, phase current 905 and common mode voltage 907 are shown.

Reference will now be made to an example common mode capacitor selection according to an embodiment of the present invention. As seen in equation 1 (common mode attenuation) and equation 2 (phase current controllability) shown below: the larger the value of Ccm (see, e.g., capacitors 501 and 503 of FIG. 2) the less the common mode voltage on the DC links; also, as Ccm increases the controllability of the converter decreases as uncontrolled neutral currents begin to flow.

$$C_{cm} \gg C_{cm1} \quad V_{Ccm1} \approx V_{cm} \frac{1}{(2\pi f)^2 \frac{L}{3} 2C_{cm} + 1} \quad (1)$$

$$I_{fb} \approx \frac{V^*}{2\pi f L + R_s} \frac{\frac{L}{4C_{cm}}}{(2\pi f)^2 \frac{L}{2} 2C_{cm} + 1} \quad (2)$$

Figure 10A:
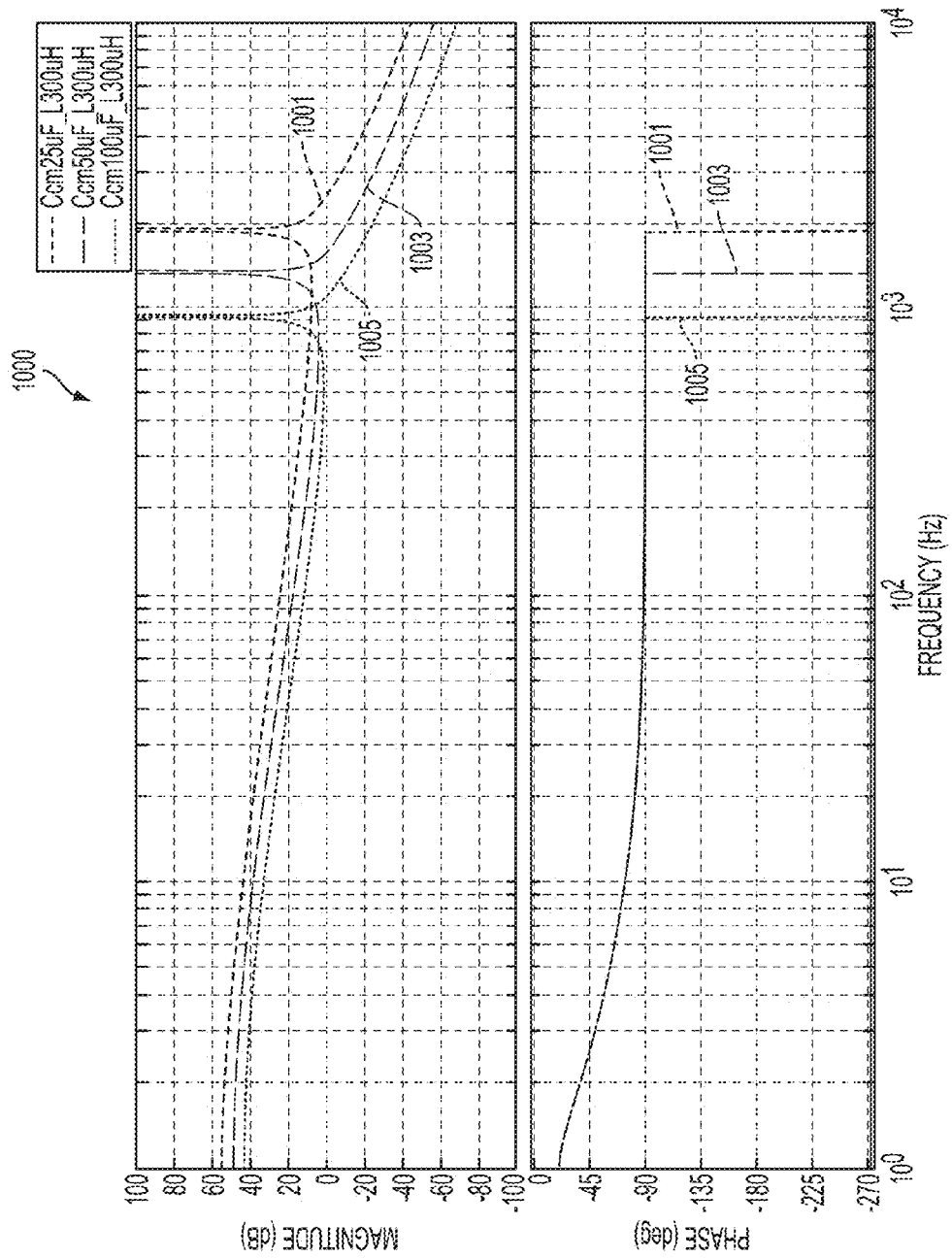
FIG. 10A is a sample plant controllability plot (showing a Bode Diagram, From: Vcmd, To: Transfer Fcn1 (of FIG. 10B)) according to an embodiment of the present invention.

Referring now to FIG. 10A, shown is a sample plant controllability plot 1000 according to an embodiment of the present invention (the upper chart has frequency on the x-axis and magnitude on the y-axis and the lower chart has frequency on the x-axis and phase on the y-axis). In this FIG. 10A, lines 1001 are plotted for a common mode capacitance of 25 uF (and inductance of 300 uH). Further, lines 1003 are plotted for a common mode capacitance of 50 uF (and inductance of 300 uH). Further still, lines 1005 are plotted for a common mode capacitance of 100 uF (and inductance of 300 uH). As seen, as common mode capacitance increases, the circuit may become uncontrollable at lower frequencies because neutral currents acquire an uncontrolled feedback path.

Figure 10B:
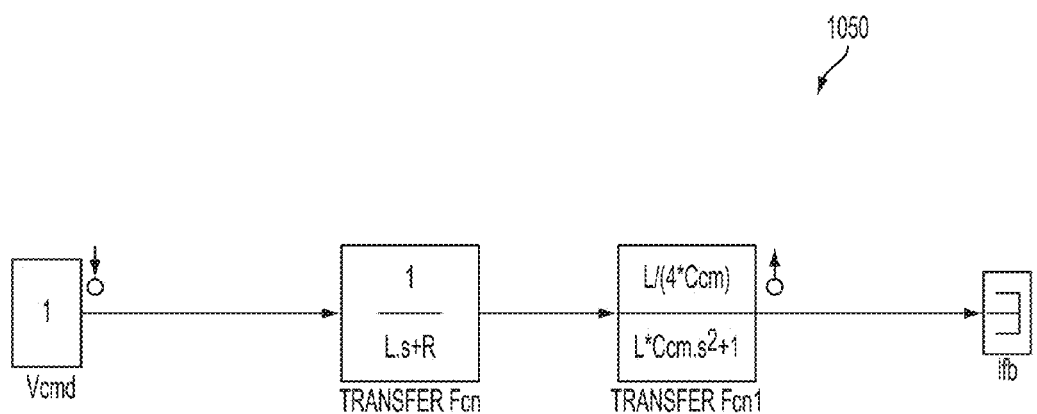
FIG. 10B is a sample transfer function diagram associated with the plot of FIG. 10A according to an embodiment of the present invention.

Referring now to FIG. 10B, shown is a sample transfer function diagram 1050 associated with the plot of FIG. 10A. In this FIG. 10B, the "." represents multiplication; the s is the complex laplace variable.

Figure 11A:
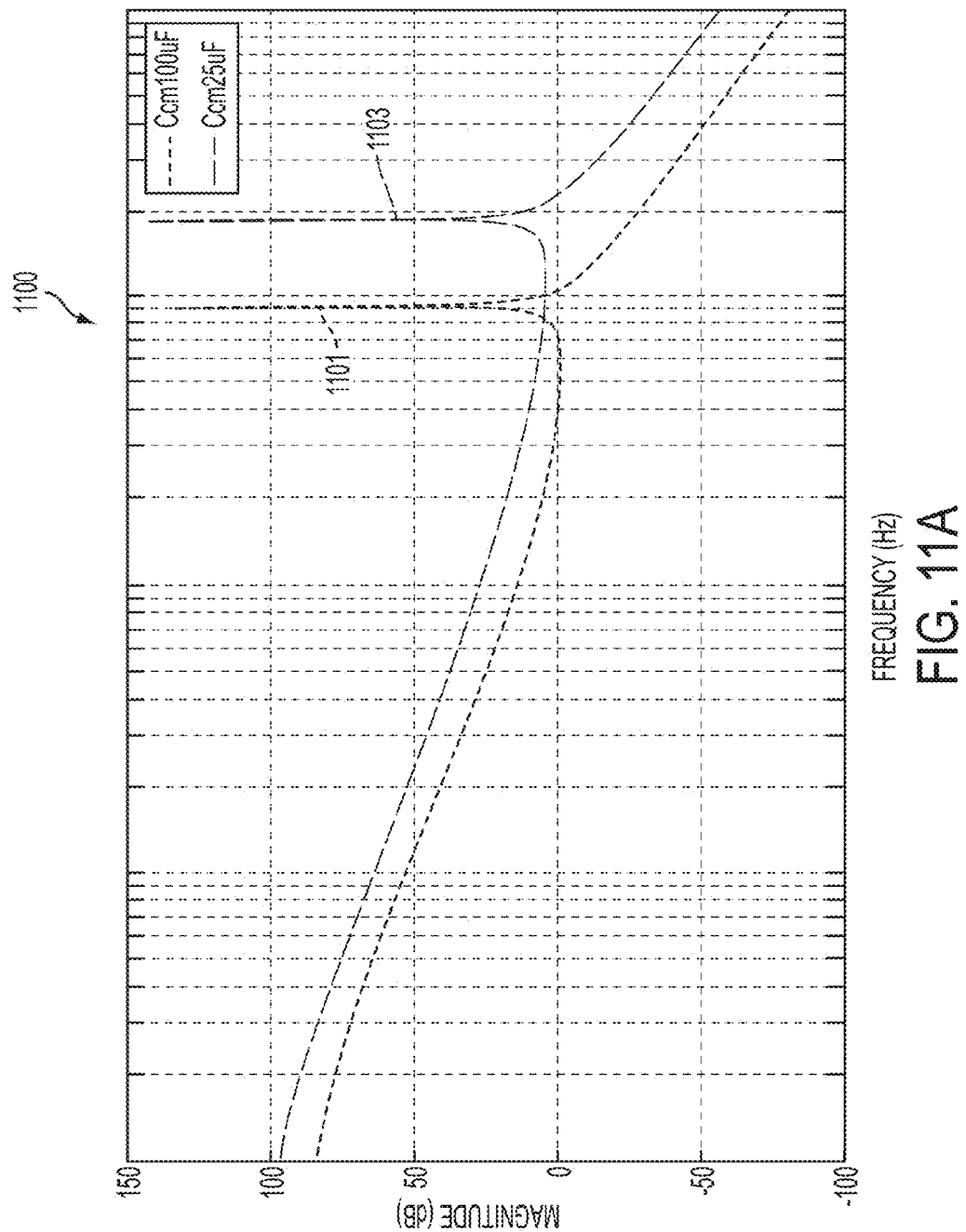
FIG. 11A is a sample open loop controllability plot (showing a Bode Diagram, From: Vcmd1, To: Transfer Fcn4 (of FIG. 11B)) according to an embodiment of the present invention.

Referring now to FIG. 11A, shown is a sample open loop controllability plot according to an embodiment of the present invention (the chart has frequency on the x-axis and magnitude on the y-axis). In this FIG. 11A, line 1101 is plotted for a common mode capacitance of 100 uF. Further, line 1103 is plotted for a common mode capacitance of 25 uF. As seen, for equivalent controllers high common mode capacitance eliminates open loop gain at lower frequencies.

Figure 11B:
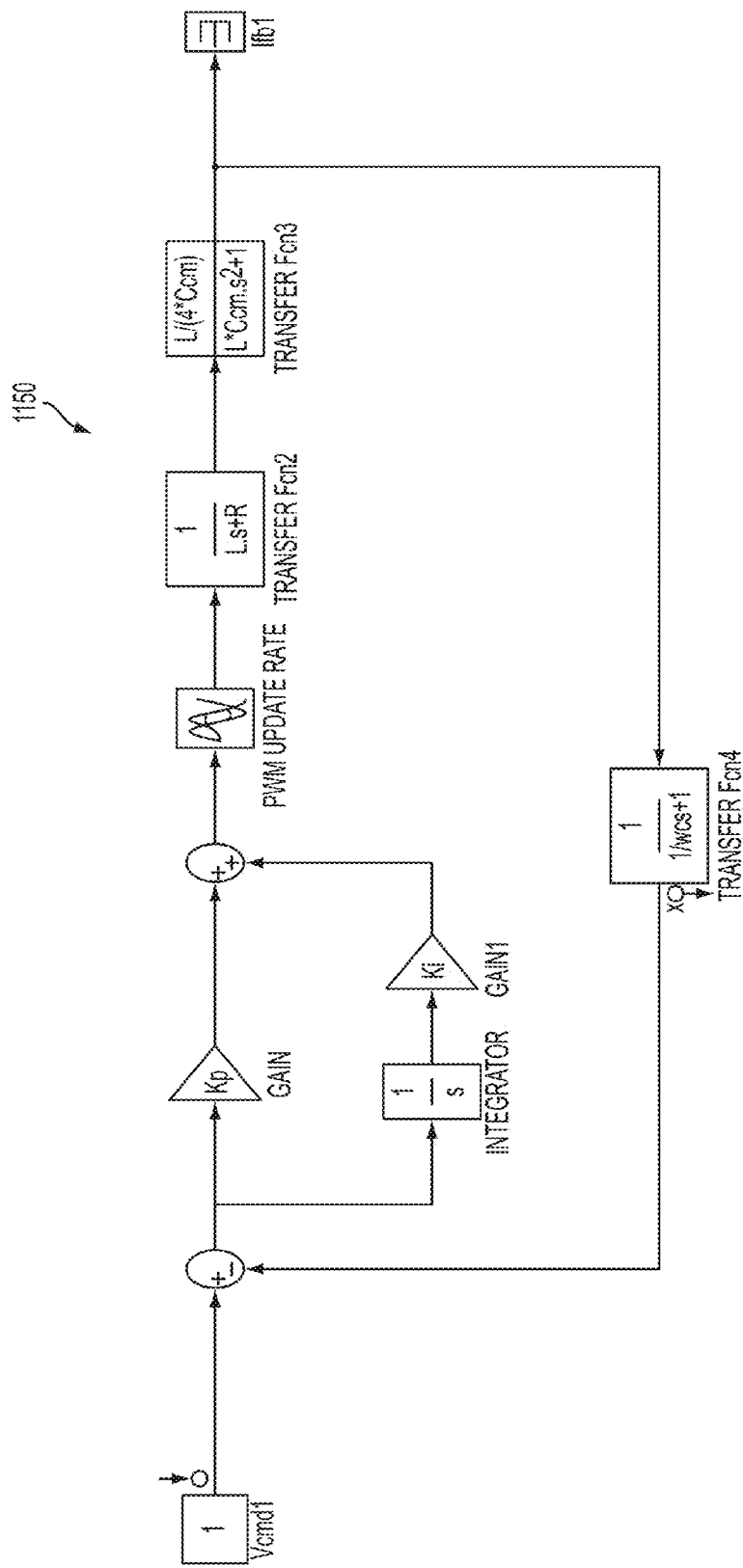
FIG. 11B is a sample transfer function diagram associated with the plot of FIG. 11A according to an embodiment of the present invention.

Referring now to FIG. 11B, shown is a sample transfer function diagram 1150 associated with the plot of FIG. 11A. In this FIG. 11B, the "." represents multiplication; the s is the complex laplace variable.

Reference will now be made to Improved IGBT (Insulated Gate Bipolar Transistor) Loss Distribution according to an embodiment of the present invention (in this regard, see FIGS. 12A and 12B). More particularly, it is noted that typical IGBT packages contain half as much silicon in the diode as they do in the switch. This construction leads to a desire to transfer losses out of the diode in order to maintain even loss densities. Additional benefits are realized from an overall decrease in the amount of power that needs to be processed as all inverter loads can consume unprocessed power.

Figure 12A:
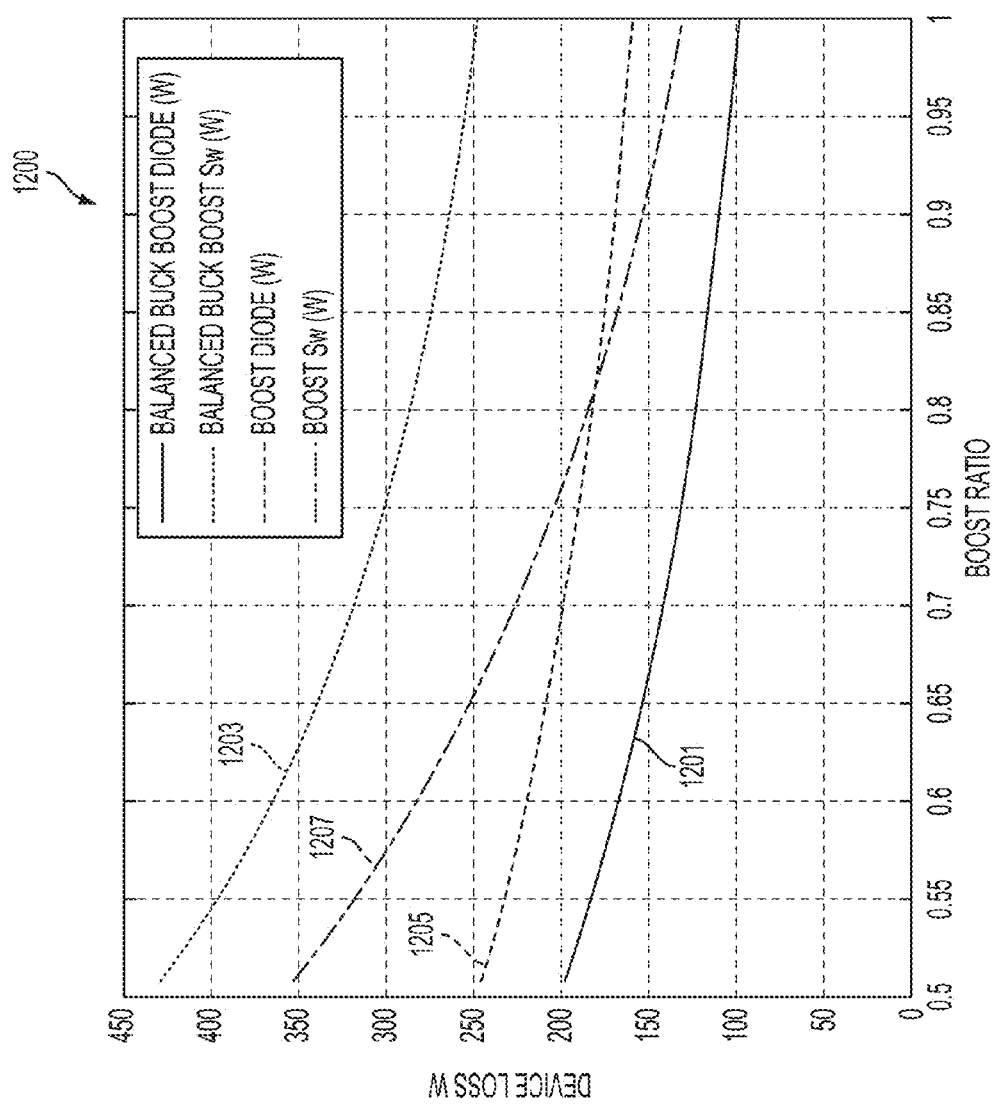
FIG. 12A is a sample device loss plot according to an embodiment of the present invention.

Referring now to FIG. 12A, shown is a sample device loss plot 1200 according to an embodiment of the present invention (the chart has boost ratio on the x-axis and device loss on the y-axis). In this FIG. 12A, line 1201 is plotted for balanced buck boost diode (W), line 1203 is plotted for balanced buck boost switch (W), line 1205 is plotted for boost diode (W), and line 1207 is plotted for boost switch (W).

Figure 12B:
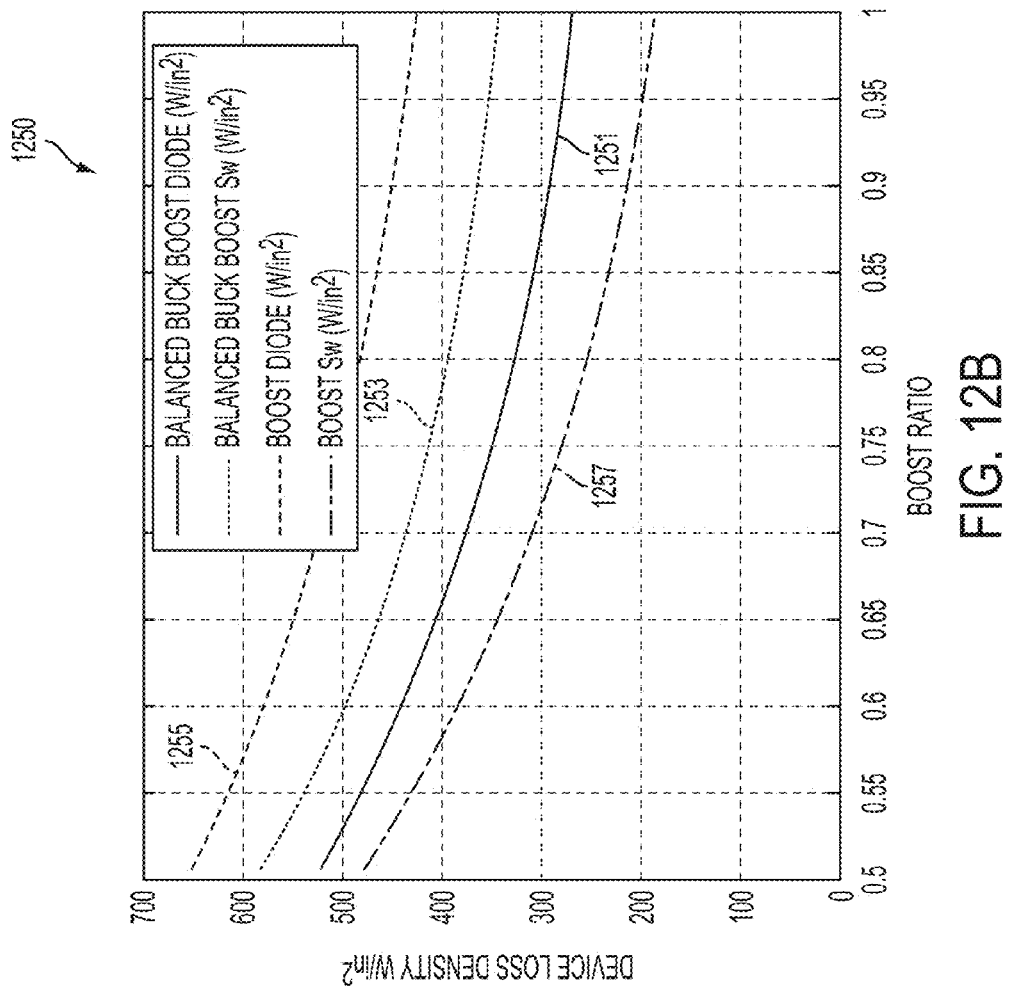
FIG. 12B is a sample device loss density plot according to an embodiment of the present invention.

Referring now to FIG. 12B, shown is a sample device loss density plot 1250 according to an embodiment of the present invention (the chart has boost ratio on the x-axis and device loss density on the y-axis). In this FIG. 12B, line 1251 is plotted for balanced buck boost diode (W/in$^2$), line 1253 is plotted for balanced buck boost switch (W/in$^2$), line 1255 is plotted for boost diode (W/in$^2$), and line 1257 is plotted for boost switch (W/in$^2$).

As described herein is an input output balanced bidirectional buck-boost converter. Benefits provided by various embodiments of the converter include: (1) Standard power control: (a) Only two current sensors per inverter; (b) BEMF position sensorless Vector Control provides phase current and dc voltage regulation; and/or (c) V/Hz provides effective inverter sourced EMF (PFC (Power Factor Correction) loop can dynamically optimize V/Hz voltage); (2) Simple DC bus architecture: (a) Inherently supports overlapping DC bus voltages (buck/boost); and/or (b) Controlled common mode voltages and currents; (3) Independent isolation fault detection through balanced input and output; and/or (4) Reduced IGBT power density over certain conventional buck boost topologies.

As described herein is a specific DC link architecture that may be used in the context of an input output balanced bidirectional buck-boost converter. Benefits provided by various embodiments of the DC link architecture include: (1) Both input and output DC links are centered around chassis (balanced): (a) Allows for independent AC and DC isolation fault detection; and/or (b) Voltages with respect to chassis are minimized; (2) Minimum number of high voltage DC links to manage; and/or (3) Inverter loads can consume unprocessed power reducing the load on the power converter.

Of note, certain conventional DC/DC buck-boost topologies have input and output voltages which share a common reference. These converters may be inherently less safe because the two inverters will have different DC link offset voltages with respect to chassis, and the maximum voltage stress to chassis for either inverter and its loads will be greater than half of the DC link value.

In contrast, a converter according to various embodiments of the present invention provides for the following: (a) is single fault tolerant; (b) because both the input and output voltages are balanced and independent, both AC and DC leakage faults can be independently detected and isolated to each side of the converter; (c) handle common mode voltages and currents in order to provide input and output voltages with minimal common mode activity with respect to chassis; (d) utilize only two current sensors and standard motor control techniques in order to provide DC voltage regulation; (e) by controlling AC line currents, optimally utilizes the standard IGBT packaging in which the diode is undersized with respect to the IGBT by better distributing the loss density in the IGBT packages.

In one embodiment, a bidirectional buck-boost converter is provided, comprising: a first inverter, the first inverter comprising a first inverter positive DC terminal, a first inverter negative DC terminal, a first inverter phase one AC terminal, a first inverter phase two AC terminal and a first inverter phase three AC terminal; a second inverter, the second inverter comprising a second inverter positive DC terminal, a second inverter negative DC terminal, a second inverter phase one AC terminal, a second inverter phase two AC terminal and a second inverter phase three AC terminal; a phase one inductor wound on a phase one inductor core, the phase one inductor being configured to electrically connect the first inverter phase one AC terminal with the second inverter phase one AC terminal; a phase two inductor wound on a phase two inductor core, the phase two inductor being configured to electrically connect the first inverter phase two AC terminal with the second inverter phase two AC terminal; a phase three inductor wound on a phase three inductor core, the phase three inductor being configured to electrically connect the first inverter phase three AC terminal with the second inverter phase three AC terminal; a positive side DC capacitor configured to electrically connect the positive DC terminal of the first inverter to the positive DC terminal of the second inverter; and a negative side DC capacitor configured to electrically connect the negative DC terminal of the first inverter to the negative DC terminal of the second inverter; wherein each of the phase one inductor core, the phase two inductor core and the phase three inductor core are independent cores.

In one example, the converter further comprises a controller.

In another example, the controller is configured to cause the first inverter to generate three-phase voltage at a fixed-frequency.

In another example, the fixed-frequency three-phase voltage of the first inverter is provided at the first inverter phase one AC terminal, the first inverter phase two AC terminal and the first inverter phase three AC terminal.

In another example, the controller is configured to cause the second inverter to generate three-phase current at the fixed-frequency.

In another example, the controller is configured to cause the second inverter to generate the three-phase current at the fixed-frequency based upon the fixed-frequency three-phase voltage of the first inverter provided by the first inverter phase one AC terminal, the first inverter phase two AC terminal and the first inverter phase three AC terminal.

In another example: the first inverter positive DC terminal and the first inverter negative DC terminal are connected to a current source; and the second inverter positive DC terminal and the second inverter negative DC terminal are connected to a current sink.

In another example, the current source is a battery.

In another example, the current sink is a battery and the current source is a fuel cell.

In another example, the controller comprises a processor.

In another example, the controller comprises at least one of an ASIC and an FPGA.

In another example, the converter further comprises a memory storing computer readable instructions.

In another example, the memory comprises at least one of hardware and firmware.

In another example, the memory comprises a computer readable medium and the computer readable instructions comprise a software program.

In another embodiment, a power system configured for use in a vehicle is provided, the power system comprising: a current source; a current sink; a controller; and a bidirectional buck-boost converter, the bidirectional buck-boost converter comprising: a first inverter, the first inverter comprising a first inverter positive DC terminal, a first inverter negative DC terminal, a first inverter phase one AC terminal, a first inverter phase two AC terminal and a first inverter phase three AC terminal; a second inverter, the second inverter comprising a second inverter positive DC terminal, a second inverter negative DC terminal, a second inverter phase one AC terminal, a second inverter phase two AC terminal and a second inverter phase three AC terminal; a phase one inductor wound on a phase one inductor core, the phase one inductor being configured to electrically connect the first inverter phase one AC terminal with the second inverter phase one AC terminal; a phase two inductor wound on a phase two inductor core, the phase two inductor being configured to electrically connect the first inverter phase two AC terminal with the second inverter phase two AC terminal; a phase three inductor wound on a phase three inductor core, the phase three inductor being configured to electrically connect the first inverter phase three AC terminal with the second inverter phase three AC terminal; a positive side DC capacitor configured to electrically connect the positive DC terminal of the first inverter to the positive DC terminal of the second inverter; and a negative side DC capacitor configured to electrically connect the negative DC terminal of the first inverter to the negative DC terminal of the second inverter; wherein each of the phase one inductor core, the phase two inductor core and the phase three inductor core are independent cores; and wherein the controller is configured to operate in one of: (a) a first mode in which the current source is connected to the first inverter positive DC terminal and the first inverter negative DC terminal and the current sink is connected to the second inverter positive DC terminal and the second inverter negative DC terminal; and (b) a second mode in which the current sink is connected to the first inverter positive DC terminal and the first inverter negative DC terminal and the current source is connected to the second inverter positive DC terminal and the second inverter negative DC terminal; wherein, in the first mode the controller is configured to cause: (a) the first inverter to generate three-phase voltage at a fixed-frequency; and (b) the second inverter to generate three-phase current at the fixed-frequency; and wherein, in the second mode the controller is configured to cause: (a) the second inverter to generate three-phase voltage at a fixed-frequency; and (b) the first inverter to generate three-phase current at the fixed-frequency.

In one example, in the first mode, the current source is a battery.

In another example, in the second mode, the current sink is a battery and the current source is a fuel cell.

In another example, the controller comprises a processor.

In another embodiment, a method of providing a bidirectional buck-boost converter is provided, the method comprising: providing a first inverter, the first inverter comprising a first inverter positive DC terminal, a first inverter negative DC terminal, a first inverter phase one AC terminal, a first inverter phase two AC terminal and a first inverter phase three AC terminal; providing a second inverter, the second inverter comprising a second inverter positive DC terminal, a second inverter negative DC terminal, a second inverter phase one AC terminal, a second inverter phase two AC terminal and a second inverter phase three AC terminal; providing a phase one inductor wound on a phase one inductor core, the phase one inductor electrically connecting the first inverter phase one AC terminal with the second inverter phase one AC terminal; providing a phase two inductor wound on a phase two inductor core, the phase two inductor electrically connecting the first inverter phase two AC terminal with the second inverter phase two AC terminal; providing a phase three inductor wound on a phase three inductor core, the phase three inductor electrically connecting the first inverter phase three AC terminal with the second inverter phase three AC terminal; providing a positive side DC capacitor electrically connecting the positive DC terminal of the first inverter to the positive DC terminal of the second inverter; and providing a negative side DC capacitor electrically connecting the negative DC terminal of the first inverter to the negative DC terminal of the second inverter; wherein each of the phase one inductor core, the phase two inductor core and the phase three inductor core are independent cores.

In one example, the method further comprises: causing the first inverter to generate three-phase voltage at a fixed-frequency, wherein the fixed-frequency three-phase voltage of the first inverter is provided at the first inverter phase one AC terminal, the first inverter phase two AC terminal and the first inverter phase three AC terminal; and causing the second inverter to generate three-phase current at the fixed frequency based upon the fixed-frequency three-phase voltage of the first inverter provided by the first inverter phase one AC terminal, the first inverter phase two AC terminal and the first inverter phase three AC terminal.

In other examples, any steps described herein may be carried out in any appropriate desired order.

In one example, one controller may control both inverters. In another example, each inverter may be controlled by a respective controller (that is, one controller for each inverter).

In another example, power may be shuttled back and forth without mode or "quadrant" switching.

In another example, loads may be one or more of: heaters, AC inverters for utility power, etc.

Reference will now be made to a number of example configurations associated with an embodiment of the invention (in connection with these example configurations, the following assumptions apply: (A) Inverter 1 DC terminals connected to DC Source 1; (B) Inverter 2 DC terminals Connected to DC Source 2; (C) Voltage sources are capable of delivering or sinking current; (D) Voltage sources may or may not have series impedance; (E) Those familiar with the art will understand that an SVM inverter producing an AC voltage vector can either absorb or produce AC power depending on the phase angle of the AC terminal load current).

Configuration 1—Power Transfer: Bidirectional; DC Source 1 Type: Voltage; Source 1 Detail: Bidirectional Current; Inverter 1 Mode: AC Voltage Vector; DC Source 2 Type: Voltage; Source 2 Detail: Bidirectional Current; Inverter 2 Mode: Vector Controlled Sensorless; Inverter 2 Voltage Loop: No.

Configuration 2—Power Transfer: Bidirectional; DC Source 1 Type: Voltage; Source 1 Detail: Bidirectional Current; Inverter 1 Mode: AC Voltage Vector; DC Source 2 Type: Current/Power; Source 2 Detail: Motor Drive(s), other; Inverter 2 Mode: Vector Controlled Sensorless; Inverter 2 Voltage Loop: Yes.

Configuration 3—Power Transfer: Bidirectional; DC Source 1 Type: Voltage; Source 1 Detail: Fuel Cell//Loads; Inverter 1 Mode: AC Voltage Vector; DC Source 2 Type: Battery//Loads; Source 2 Detail: Bidirectional Current; Inverter 2 Mode: Vector Controlled Sensorless; Inverter 2 Voltage Loop: Optional.

Configuration 4—Power Transfer: Bidirectional; DC Source 1 Type: Voltage; Source 1 Detail: Battery//Loads; Inverter 1 Mode: AC Voltage Vector; DC Source 2 Type: Fuel Cell//Loads; Source 2 Detail: Bidirectional Current; Inverter 2 Mode: Vector Controlled Sensorless; Inverter 2 Voltage Loop: Optional.

Configuration 5—Power Transfer: 1→2; DC Source 1 Type: Voltage; Source 1 Detail: Fuel Cell—current output only; Inverter 1 Mode: AC Voltage Vector; DC Source 2 Type: Voltage; Source 2 Detail: Battery; Inverter 2 Mode: Vector Controlled Sensorless; Inverter 2 Voltage Loop: Optional.

Configuration 6—Power Transfer: 2→1; DC Source 1 Type: Voltage; Source 1 Detail: Battery; Inverter 1 Mode: AC Voltage Vector; DC Source 2 Type: Voltage; Source 2 Detail: Fuel Cell—output only, other; Inverter 2 Mode: Vector Controlled Sensorless; Inverter 2 Voltage Loop: Optional.

As described herein, various embodiments may have the capability to evaluate composite leakage faults. In one example, this may require modification to a space vector which introduces a DC shift between the DC link offsets. In another example, independent chassis fault detection may be used for fuel cell isolation resistance measurement.

As will be appreciated by one skilled in the art, aspects of the present invention may be embodied as a converter, system, method and/or computer program product. Accordingly, aspects of the present invention may take the form of an entirely hardware embodiment or an embodiment combining software and hardware aspects. Furthermore, aspects of the present invention may take the form of a computer program product embodied in one or more computer readable medium (s) having computer readable program code embodied thereon. In one example, the computer readable medium may tangibly embody the program code in a non-transitory manner.

As described herein, the disclosed converter may be used to interface any DC power source with an energy storage system. In one specific example, the converter may be applied in the context of a vehicle (e.g., a fuel cell bus). In another specific example, the disclosed inverter may be used in connection with a high voltage battery. In another embodiment, by replacing the line reactors and link capacitors with a 3 phase transformer, the converter may be used to provide an isolated balanced input balanced output bidirectional buck/boost converter.

It is noted that the foregoing has outlined some of the embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. Further, it is noted that all examples disclosed herein are intended to be illustrative, and not restrictive.

What is claimed is:

1. A bidirectional buck-boost converter, comprising:
a first inverter, the first inverter comprising a first inverter positive DC terminal, a first inverter negative DC terminal, a first inverter phase one AC terminal, a first inverter phase two AC terminal and a first inverter phase three AC terminal;
a second inverter, the second inverter comprising a second inverter positive DC terminal, a second inverter negative DC terminal, a second inverter phase one AC terminal, a second inverter phase two AC terminal and a second inverter phase three AC terminal;
a phase one inductor wound on a phase one inductor core, the phase one inductor being configured to electrically connect the first inverter phase one AC terminal with the second inverter phase one AC terminal;
a phase two inductor wound on a phase two inductor core, the phase two inductor being configured to electrically connect the first inverter phase two AC terminal with the second inverter phase two AC terminal;
a phase three inductor wound on a phase three inductor core, the phase three inductor being configured to electrically connect the first inverter phase three AC terminal with the second inverter phase three AC terminal;
a positive side DC capacitor configured to electrically connect the positive DC terminal of the first inverter to the positive DC terminal of the second inverter; and
a negative side DC capacitor configured to electrically connect the negative DC terminal of the first inverter to the negative DC terminal of the second inverter;
wherein each of the phase one inductor core, the phase two inductor core and the phase three inductor core are independent cores.

2. The converter of claim 1, further comprising a controller.

3. The converter of claim 2, wherein the controller is configured to cause the first inverter to generate three-phase voltage at a fixed-frequency.

4. The converter of claim 3, wherein the fixed-frequency three-phase voltage of the first inverter is provided at the first inverter phase one AC terminal, the first inverter phase two AC terminal and the first inverter phase three AC terminal.

5. The converter of claim 4, wherein the controller is configured to cause the second inverter to generate three-phase current at the fixed-frequency.

6. The converter of claim 5, wherein the controller is configured to cause the second inverter to generate the three-phase current at the fixed-frequency based upon the fixed-frequency three-phase voltage of the first inverter provided by the first inverter phase one AC terminal, the first inverter phase two AC terminal and the first inverter phase three AC terminal.

7. The converter of claim 6, wherein:
the first inverter positive DC terminal and the first inverter negative DC terminal are connected to a current source; and
the second inverter positive DC terminal and the second inverter negative DC terminal are connected to a current sink.

8. The converter of claim 7, wherein the current source is a battery.

9. The converter of claim 7, wherein the current sink is a battery and the current source is a fuel cell.

10. The converter of claim 2, wherein the controller comprises a processor.

11. The converter of claim 10, wherein the controller comprises at least one of an ASIC and an FPGA.

12. The converter of claim 10, further comprising a memory storing computer readable instructions.

13. The converter of claim 12, wherein the memory comprises at least one of hardware and firmware.

14. The converter of claim 12, wherein the memory comprises a computer readable medium and the computer readable instructions comprise a software program.

15. A power system configured for use in a vehicle, the power system comprising:
a current source;
a current sink;

a controller; and a bidirectional buck-boost converter, the bidirectional buck-boost converter comprising:

a first inverter, the first inverter comprising a first inverter positive DC terminal, a first inverter negative DC terminal, a first inverter phase one AC terminal, a first inverter phase two AC terminal and a first inverter phase three AC terminal;

a second inverter, the second inverter comprising a second inverter positive DC terminal, a second inverter negative DC terminal, a second inverter phase one AC terminal, a second inverter phase two AC terminal and a second inverter phase three AC terminal;

a phase one inductor wound on a phase one inductor core, the phase one inductor being configured to electrically connect the first inverter phase one AC terminal with the second inverter phase one AC terminal;

a phase two inductor wound on a phase two inductor core, the phase two inductor being configured to electrically connect the first inverter phase two AC terminal with the second inverter phase two AC terminal;

a phase three inductor wound on a phase three inductor core, the phase three inductor being configured to electrically connect the first inverter phase three AC terminal with the second inverter phase three AC terminal;

a positive side DC capacitor configured to electrically connect the positive DC terminal of the first inverter to the positive DC terminal of the second inverter; and a negative side DC capacitor configured to electrically connect the negative DC terminal of the first inverter to the negative DC terminal of the second inverter;

wherein each of the phase one inductor core, the phase two inductor core and the phase three inductor core are independent cores; and wherein the controller is configured to operate in one of: (a) a first mode in which the current source is connected to the first inverter positive DC terminal and the first inverter negative DC terminal and the current sink is connected to the second inverter positive DC terminal and the second inverter negative DC terminal; and (b) a second mode in which the current sink is connected to the first inverter positive DC terminal and the first inverter negative DC terminal and the current source is connected to the second inverter positive DC terminal and the second inverter negative DC terminal;

wherein, in the first mode the controller is configured to cause: (a) the first inverter to generate three-phase voltage at a fixed-frequency; and (b) the second inverter to generate three-phase current at the fixed-frequency; and wherein, in the second mode the controller is configured to cause: (a) the second inverter to generate three-phase voltage at a fixed-frequency; and (b) the first inverter to generate three-phase current at the fixed-frequency.

16. The converter of claim 15, wherein, in the first mode, the current source is a battery.

17. The converter of claim 15, wherein, in the second mode, the current sink is a battery and the current source is a fuel cell.

18. The converter of claim 15, wherein the controller comprises a processor.

19. A method of providing a bidirectional buck-boost converter, the method comprising:

providing a first inverter, the first inverter comprising a first inverter positive DC terminal, a first inverter negative DC terminal, a first inverter phase one AC terminal, a first inverter phase two AC terminal and a first inverter phase three AC terminal;

providing a second inverter, the second inverter comprising a second inverter positive DC terminal, a second inverter negative DC terminal, a second inverter phase one AC terminal, a second inverter phase two AC terminal and a second inverter phase three AC terminal;

providing a phase one inductor wound on a phase one inductor core, the phase one inductor electrically connecting the first inverter phase one AC terminal with the second inverter phase one AC terminal;

providing a phase two inductor wound on a phase two inductor core, the phase two inductor electrically connecting the first inverter phase two AC terminal with the second inverter phase two AC terminal;

providing a phase three inductor wound on a phase three inductor core, the phase three inductor electrically connecting the first inverter phase three AC terminal with the second inverter phase three AC terminal;

providing a positive side DC capacitor electrically connecting the positive DC terminal of the first inverter to the positive DC terminal of the second inverter; and providing a negative side DC capacitor electrically connecting the negative DC terminal of the first inverter to the negative DC terminal of the second inverter;

wherein each of the phase one inductor core, the phase two inductor core and the phase three inductor core are independent cores.

20. The method of claim 19, further comprising:

causing the first inverter to generate three-phase voltage at a fixed-frequency, wherein the fixed-frequency three-phase voltage of the first inverter is provided at the first inverter phase one AC terminal, the first inverter phase two AC terminal and the first inverter phase three AC terminal; and causing the second inverter to generate three-phase current at the fixed-frequency based upon the fixed-frequency three-phase voltage of the first inverter provided by the first inverter phase one AC terminal, the first inverter phase two AC terminal and the first inverter phase three AC terminal.

* * * * *